Patented Aug. 16, 1932

1,871,830

UNITED STATES PATENT OFFICE

BRUNO WENDT, OF DESSAU IN ANHALT, AND HANS BINCER, OF DESSAU-ZIEBIGK, GERMANY, ASSIGNOR TO AGFA ANSCO CORPORATION, OF BINGHAMTON, NEW YORK, A CORPORATION OF NEW YORK

FIXING PHOTOGRAPHIC BLEACHING-OUT LAYERS

No Drawing. Application filed May 2, 1930, Serial No. 449,356, and in Germany May 11, 1929.

Our present invention relates to an improvement in the manufacture of color pictures and more particularly to a process of fixing photographic bleaching-out layers containing basic dyestuffs.

We have found that the salts formed of basic dyestuffs with borofluohydric acid, which have not hitherto been described in literature, are distinguished by the property of being insoluble or very sparingly soluble in water and in certain organic solvents such as, for instance, alcohols, especially in the presence of a small amount of hydrofluoboric acid or a salt thereof.

According to our invention, the aforesaid property is used for fixing photographic layers containing a basic dyestuff which is of such a nature that it is partially or completely rendered colorless by exposure to light in the presence of a suitable sensitizer. The fixing of such layers, which involves the removal of the sensitizer contained in the layer, has hitherto been associated with difficulty owing to the fact that the solvents suitable for dissolving the sensitizer and removing it from the layer also tend to dissolve the dyestuffs themselves.

According to the present invention, the bleaching-out layer is treated, after exposure to light under an original, for instance, a negative, with a solution of hydrofluoboric acid or of a salt thereof in a solvent which is capable of dissolving the sensitizer contained in the layer. By this operation the dyestuff or dyestuffs contained in the layer are transformed into insoluble borofluorides whilst the sensitizer is simultaneously dissolved.

In order that the basic dyestuff or dyestuffs contained in the layer may be converted as quickly as possible into the insoluble salt, it is advisable to treat the layer first with a concentrated solution of hydrofluoboric acid or a salt thereof, and subsequently with a more dilute solution of this acid or of a salt thereof, in order to remove the sensitizer.

The following example illustrates the invention:—

A gelatin layer which contains anilido-flavindulin chloride and has been sensitized by means of thiosinamine is washed for 2 minutes after it has been exposed to light under a negative, in an aqueous solution of sodium borofluoride of 12 per cent strength. Thereupon it is after-treated three or four times, each time for 15 minutes, in an aqueous solution of sodium borofluoride of 1 per cent strength and finally dried.

Our invention is not limited to the foregoing example or to the specific details given therein. Thus, for instance, photographic layers containing other basic dyes may be used. From the great number of basic dyes which are well known in the art, we enumerate Flavindulin (Schultz, Farbstofftabellen, 6th edition, No. 668, Berlin), Rosindulin 2B (Farbstofftabellen No. 673), Capriblue GON (Farbstofftabellen No. 620), Methylene blue (Farbstofftabellen No. 659), Naphthol Blue R (Farbstofftabellen No. 649), Pyronin G (Farbstofftabellen No. 568), but obviously, other basic dyestuffs may be treated in the same manner. Instead of thiosinamine used as a sensitizer in the foregoing example, other sensitizers, such as allylthioureas substituted by aryl or alkyl groups, may be incorporated in the light sensitive layer. The removal of the said sensitizers may be carried out with a solvent other than water such as, for instance, aliphatic alcohols or acetone diluted with water. The sodium borofluoride used in the example may be substituted by another soluble salt or by a free borofluohydric acid.

What we claim is:—

1. In the process of fixing bleaching-out layers containing light sensitive basic dyes and a sensitizer, the step which comprises treating the said layers after exposure to light with a solution containing a compound of the group consisting of free borofluohydric acid or a soluble salt thereof.

2. In the process of fixing bleaching-out layers containing light sensitive basic dyes and a sensitizer, the step which comprises treating the said layers after exposure to light with a solution containing a compound of the group consisting of free borofluohydric acid or a soluble salt thereof in a solvent dissolving the sensitizer.

3. In the process of fixing bleaching-out layers containing light sensitive basic dyes and an allylthiourea, the step which comprises treating the said layers with a solution containing a compound of the group consisting of free borofluohydric acid or a soluble salt thereof.

4. In the process of fixing bleaching-out layers containing light sensitive basic dyes and an allylthiourea, the step which comprises treating the said layers with a solution containing a compound of the group consisting of free borofluohydric acid or a soluble salt thereof in a solvent dissolving the allylthiourea.

5. In the process of fixing bleaching-out layers containing light sensitive basic dyes and a sensitizer, the step which comprises treating the said layers with a solution containing about 12 per cent of a compound of the group consisting of free borofluohydric acid or a soluble salt thereof, and after-treating the layer with water containing about 1 per cent of the said borofluohydric compound.

6. In the process of fixing bleaching-out layers containing light sensitive basic dyes and an allylthiourea, the step which comprises treating the said layers with a solution containing about 12 per cent of a compound of the group consisting of free borofluohydric acid or a soluble salt thereof, and after-treating the layer with water containing about 1 per cent of the said borofluohydric compound.

7. A photographic picture formed by the salt of a basic bleaching-out dyestuff with borofluohydric acid.

In testimony whereof, we affix our signatures.

BRUNO WENDT.
HANS BINCER.